United States Patent [19]

Reed

[11] Patent Number: 5,349,459
[45] Date of Patent: Sep. 20, 1994

[54] SECURE REMOTE CONTROL SYSTEM

[75] Inventor: Irving S. Reed, Santa Monica, Calif.

[73] Assignee: Rockwell International Corporation, Pittsburgh, Pa.

[21] Appl. No.: 884,971

[22] Filed: May 18, 1992

[51] Int. Cl.$^5$ ............................................ H04B 10/02
[52] U.S. Cl. .................................... 359/142; 359/145; 359/148; 340/825.57; 340/825.6; 340/825.64
[58] Field of Search ........... 340/825.63, 825.6, 825.57, 340/825.64; 359/142, 145, 148

[56] References Cited

U.S. PATENT DOCUMENTS

| | | | |
|---|---|---|---|
| 4,459,591 | 7/1984 | Haubner et al. | 340/825.57 |
| 4,652,860 | 3/1987 | Weishaupt et al. | 340/825.5 X |
| 4,754,255 | 6/1988 | Sanders et al. | 341/176 X |

*Primary Examiner*—Douglas W. Olms
*Assistant Examiner*—Russell W. Blum

[57] ABSTRACT

A vehicle access transmitter and receiver pair which cooperate to implement a code transmission strategy which requires a minimum amount of energy thereby accomplishing maximum battery life while achieving operations secure from unauthorized access. The transmitter produces a string of start-and-stop pulse pairs which are each spaced in a timed interval so as to represent unique values. In operation the transmitter generates a sequence of four start-and-stop pulses with the duration of start-and-stop pulse pair proportional to the respective key code. The receiver detects the pulses and supplies them to a code comparison circuit. A lock code is stored and supplied to the code comparison circuit. During the reception time between each start-and-stop pulse in a pair, the demodulator counts up sequentially producing a vector sum of the lock code and the received code value. If the vector sum of all code valves stored and received equals zero, then a VALID signal is generated by the code comparison circuit permitting access to the vehicle via the selected path, i.e., Door, Trunk, etc.

10 Claims, 1 Drawing Sheet

SECURE REMOTE CONTROL SYSTEM

BACKGROUND OF THE INVENTION

1. Field of the Invention

This invention is related to techniques for providing security in remote control systems; and, more particularly, to vehicle access systems featuring efficient communications and secure access code.

2. Description of the Prior Art

Remote control systems, such as those used for remote control locking and unlocking of vehicles, must meet a number of requirements in order to provide satisfactory performance. Such a system must be efficient so that it will not require frequent battery replacement. The system must also be sufficiently reliable that a user can depend on it operating within a reasonable distance from the vehicle and from all directions around the vehicle. In addition, a remote control system must have adequate security features so that it cannot be activated by an unauthorized user, whether inadvertently through stray signals from another system or deliberately by someone attempting to gain entry to the vehicle for illegal purposes.

SUMMARY OF THE PRESENT INVENTION

The present invention incudes a vehicle access transmitter and receiver pair which cooperate to implement a code transmission strategy which requires a minimum amount of energy thereby accomplishing maximum battery life while achieving operations secure from unauthorized access. The transmitter produces a string of start-and-stop pulse pairs which are each spaced in a timed interval so as to represent unique values.

In operation the transmitter generates a sequence of four start-and-stop pulses with the duration of start-and-stop pulse pair proportional to the respective key code. The receiver detects the pulses and supplies them to a code comparison circuit.

A lock code is stored and supplied to the code comparison circuit. During the reception time between each start-and-stop pulse in a pair, the demodulator counts up sequentially producing a vector sum of the lock code and the received code value.

If the vector sum of all code valves stored and received equals zero, then a VALID signal is generated by the code comparison circuit permitting access to the vehicle via the selected path, i.e., Door, Trunk, etc.

These and other aspects of the present invention will become more readily apparent by reference to the following detailed description of the embodiments as shown in the drawings.

DETAILED DESCRIPTION OF THE PREFERRED EMBODIMENT

The various heights of the ridges on a conventional mechanical key constitute its key "code". By observing the internal structure of the lock for such a key, one can readily ascertain that the arrangement of the pins and tumblers which serve as the lock "code" is the complement, in the mathematical sense, of the key code. In an analogous fashion, an electronic key code can be considered as a set of symbols $a = [a_1, a_2 \ldots a_k]$, where each such symbol $a_i$ of the code is represented by an integer modulus M. It is convenient to assume that $M = 2^N$ and that N is the number of bits per symbol. The symbol complement modulus M of this sequence has the same form $b = [b_1, b_2 \ldots b_k]$, but with the property that the vector sum of a and b is the all-zero vector $O = [0, 0 \ldots 0)]$, i.e., $a + b = 0$ modulus M. Thus $a = [a1, a2 \ldots ak]$ is the code of the controller key and $b = [b_1, b_2 \ldots b_k]$ is the code of the lock in the receiver.

One can assume that the symbols in these sequences are represented by letters of the alphabet. Thus, to handle the 26 letters in the alphabet, N must be at least 5. Assume, for example, that $k = 4$ and $a = [a_1, a_2, a_3, a_4] = [L, Q, H, U] = [12, 17, 8, 21]$. Then the lock code would be $b = [20, 15, 24, 11]$.

It is an outstanding feature of this invention to implement the code of the controller key a with a string of start-and-stop pulse pairs, where the ith start-and-stop pair represents the element ai. A key transmitter is used to generate an electromagnetic radiation signal including a plurality of such pulse pairs. The duration of each pulse pair is made proportional to the associated key code. A lock receiver detects the electromagnetic signal and derives the key code sequence from the time intervals in the received sequence of start-and-stop pulse pairs. The derived key code sequence is then compared to a predetermined lock code sequence and a "valid" or lock/unlock signal is generated by the receiver if each value in the derived key code sequence corresponds in a predetermined manner to each value in the lock code sequence.

Figure 1:
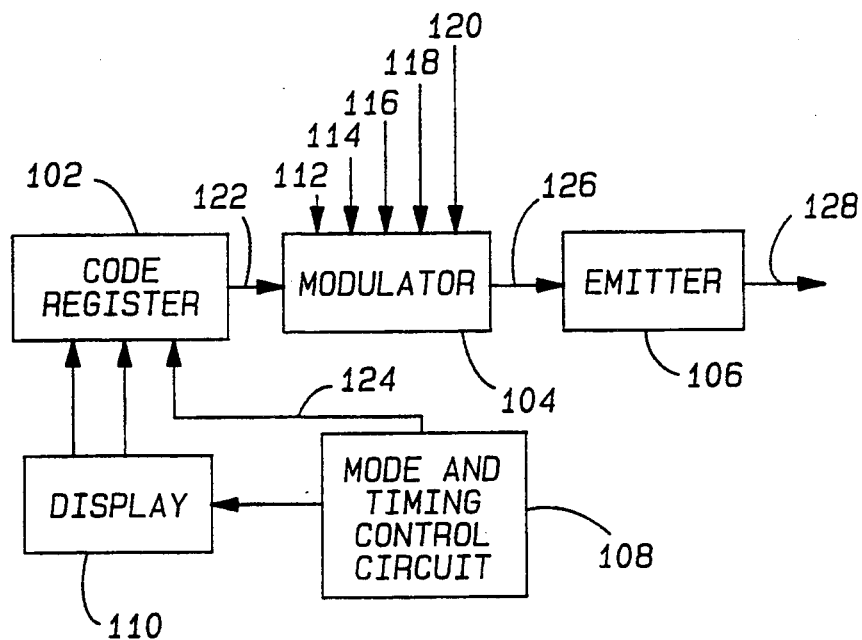
FIG. 1 is a schematic diagram of the transmitter of the present invention.

One embodiment of the transmitter of this system is depicted in schematic block diagram form in FIG. 1. The transmitter includes a code register 102, a modulator 104, an infrared radiation emitter 106, a mode and timing control circuit 108, and a display 110. User inputs to the transmitter are received through pushbuttons on the transmitter, as indicated in FIG. 1 by the DOOR input 112, the LIGHT input 114, the TRUNK input 116, the SET input 118, and the NUMBER input 120.

When the transmitter is activated by receiving a DOOR, LIGHT, or TRUNK input, the modulator 104 generates a sequence of four start-and-stop pulses, with the duration of each start-and-stop pulse pair proportional to the associated key code. The code register 102 is used to store this predetermined key code for determining the duration of each start-and-stop pulse pair and supplies this information to the modulator through an input line 122. The mode and control circuitry generates timing control signals for the code register 102, according to the combination of DOOR, LIGHT, TRUNK, and SET inputs received, through the input line 124. The appropriate sequence of start-and-stop pulses is then used to drive or modulate the infrared radiation emitter 106, which may be, for example, a light emitting diode, through the line 126. In response, the emitter 106 transmits an infrared signal 128 containing the sequence of start-and-stop pulse pairs. The SET input 118 and the NUMBER input 120, as will be explained in further detail below, are used when it is desired to change the stored key code. A receiver which operates in conjunction with the transmitter of FIG. 1 is depicted in schematic block diagram form in FIG. 2. The receiver includes an infrared detector 202, a demodulator 204, a code comparison circuit 206, a lock driver 208, a mode and timing control circuit 210, an indicator light 212, and a code register 214. The infrared detector 202 is used to detect the remote pulses sent by the transmitter (the signal 128 generated by the emitter 106 in FIG. 1). The detected pulses are supplied to the demodulator 204 through a line 21 6. The pulses are amplified in sequential order to start-and-stop an up-counter in the demodulator, whose output is supplied to the code comparison circuit through a line 218. The lock code is stored in the code register 214 and supplied to the code comparison circuit through the line 220. During the reception time between each start-and-stop pulse in a pair, the demodulator counts up sequentially. This operation is a vector sum operation. Each component sum, i.e., ai+bi, of the code vectors is implemented by the count-up procedure. If all four stop codes in the up-counter are equal to zero (modulus 32) after receiving the four start-and-stop pulses, then a VALID signal is generated by the code comparison circuit and is supplied to the lock driver 208, through the line 222. The lock driver then outputs a signal 224 for driving the locking and/or unlocking devices in the vehicle. The mode and timing control 210 is used to generate a control clock signal for the other components in the receiver. This start-and-stop counter can also be used to decide whether or not the receiver is in the SET mode or in the NORMAL mode.

Figure 2:
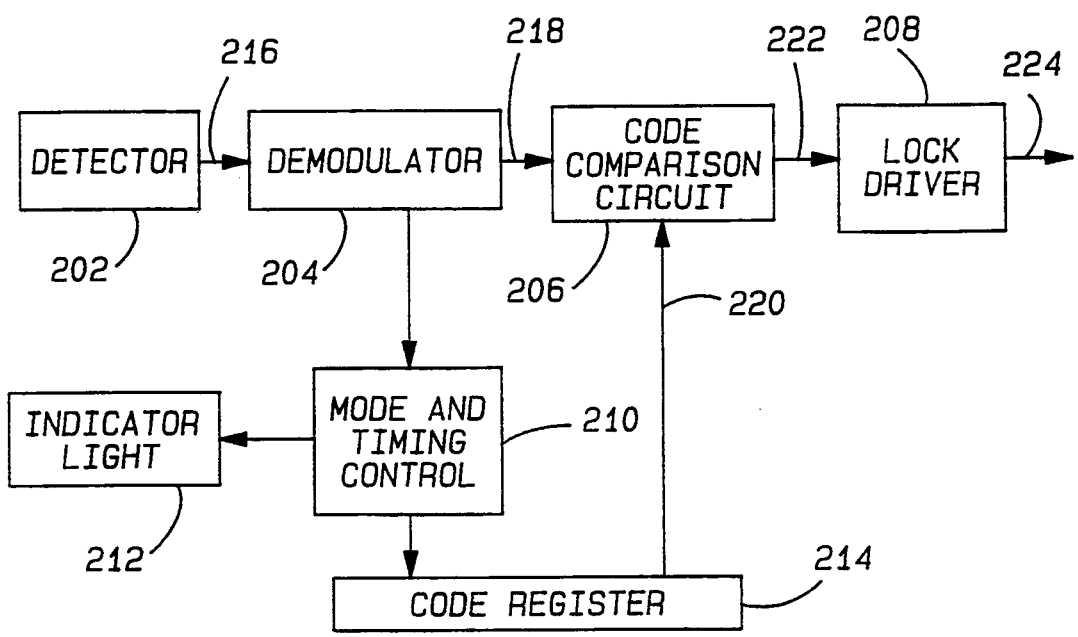
FIG. 2 is a schematic diagram of the receiver of the present invention.

The embodiment of this system illustrated in FIGS. 1 and 2 can also be readily reprogrammed by the user to change the predetermined key and lock codes. Referring to both FIGS. 1 and 2, the reprogramming process is initiated by switching the transmitter to the set mode, which the user does by pushing both the TR and the SET buttons to cause input on lines 112–116 and 118 simultaneously. In response to this action, the transmitter transmits the key code twice in order to signal the receiver to switch into its SET mode. Also, the indicator 212 on the receiver is flashed to notify the user that the receiver is in the SET mode. The key code of the transmitter can then be set sequentially by pushing the NUMBER button the desired number of times corresponding to the position of the desired letter code in the alphabet. To input an "H", for example, the user would use the NUMBER button to activate the input line 120 eight times. This action is followed by pressing the SET button to store the new code value. After all the new key codes have been input, both the TR button and the SET button are pushed simultaneously again in order to cause the key transmitter to send the new key code to the lock receiver. The receiver then counts down the received start-and-stop pulses such that the new lock code stored in the receiver is the complement of the new key code. After the setting procedure is completed, both the transmitter and receiver revert to the normal mode.

The preferred embodiments of this invention have been illustrated and described above. Modifications and additional embodiments, however, will undoubtedly be apparent to those skilled in the art. The invention can readily be implemented, for example, with other than four start-and-stop pulse pairs. Moreover, although the preferred embodiment contemplates the use of electromagnetic radiation in the infrared portion of the spectrum, other wavelengths could be used as well. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

I claim:

1. A method of providing security for a remote control system which includes a transmitter and a receiver, comprising the steps of:

generating an electromagnetic radiation signal with the transmitter, the signal including a plurality of pulse pairs, each pair including a start pulse and a stop pulse, with the time interval between each start-and-stop pulse being proportional to a corresponding value in a predetermined key code sequence;

detecting the electromagnetic signal with the receiver;

deriving the key code sequence from the time intervals in the received sequence of start-and-stop pulse pairs;

comparing the derived key code sequence to a predetermined lock code sequence; and generating a valid signal if each value in the derived key code sequence corresponds in a predetermined manner to each value in the lock code sequence by generating a valid signal if each value in the derived key code sequence is the complement of the corresponding value in the lock code sequence.

2. The method of claim 1, wherein the step of generating an electromagnetic radiation signal with the transmitter further comprises the step of:

generating an infrared signal with the transmitter, the signal including a plurality of pulse pairs, each pair including a start pulse and a stop pulse, with the time interval between each start-and-stop pulse being proportional to a corresponding value in a predetermined key code sequence.

3. The method of claim 2, wherein the step of generating an infrared signal with the transmitter further comprises the steps of:

obtaining a predetermined key code sequence from a code register;

generating an infrared signal; and modulating the infrared signal to include a plurality of pulse pairs, each pair including a start pulse and a stop pulse, with the time interval between each start-and-stop pulse being proportional to a corresponding value in the predetermined key code sequence.

4. The method of claim 1, wherein the steps of deriving the key code sequence, comparing the derived key code sequence to a predetermined lock code sequence and generating a valid signal further comprise the steps of:

using the time intervals in the received sequence of start-and-stop pulse pairs to start-and-stop an up-counter;

obtaining a predetermined lock code sequence from a code register;

summing each key code with each corresponding lock code; and generating a valid signal if the vector sum of the codes is equal to zero.

5. A secure remote control system, comprising:

a key transmitter for generating an electromagnetic radiation signal, the signal including a plurality of pulse pairs, each pair including a start pulse and a stop pulse, with the time interval between each start-and-stop pulse being proportional to a corresponding value in a predetermined key code sequence;

a lock receiver for detecting the electromagnetic signal, the receiver including:

means for deriving the key code sequence from the time intervals in the received sequence of start-and-stop pulse pairs;

means for comparing the derived key code sequence to a predetermined lock code sequence; and means for generating a valid signal if each value in the derived key code sequence corresponds in a predetermined manner to each value in the lock code sequence wherein the means for generating a valid signal further comprises:

means for generating a valid signal if each value in the derived key code sequence is the complement of the corresponding value in the lock code sequence.

6. The system of claim 5, wherein the key transmitter further comprises:

a key transmitter for generating an infrared signal, the signal including a plurality of pulse pairs, each pair including a start pulse and a stop pulse, with the time interval between each start-and-stop pulse being proportional to a corresponding value in a predetermined key code sequence.

7. The system of claim 6, wherein the key transmitter further comprises:

a code register for storing a predetermined key code sequence; and a modulator for modulating the infrared signal to include the plurality of pulse pairs.

8. The system of claim 5, wherein the means for deriving the key code sequence further comprises:

an up-counter which is started and stopped by the time interval in each received start-and-stop pulse pair.

9. The system of claim 8, wherein the means for comparing the derived key code sequence to a predetermined lock code sequence and the means for generating a valid signal further comprise:

a code register for storing a predetermined lock code sequence; and a code comparison circuit for comparing each key code to each lock code and generating a valid signal if the vector sum of the codes is equal to zero.

10. The system of claim 5, further comprising: reset means in the transmitter and the receiver by which a user can provide input to the transmitter to cause the transmitter to store a new key code sequence and the receiver to store a new lock code sequence.

* * * * *